US008462722B2

(12) United States Patent
Diachina et al.

(10) Patent No.: US 8,462,722 B2
(45) Date of Patent: Jun. 11, 2013

(54) ACCESS CONTROL FOR MACHINE-TYPE COMMUNICATION DEVICES (75) Inventors: John Diachina, Garner, NC (US); Paul Schliwa-Bertling, Ljungsbro (SE); Andreas Bergström, Vikingstad (SE); Claes-Göran Persson, Mjölby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 174 days.

(21) Appl. No.: 13/051,345

(22) Filed: Mar. 18, 2011

(65) Prior Publication Data
US 2011/0235558 A1 Sep. 29, 2011

Related U.S. Application Data (60) Provisional application No. 61/317,910, filed on Mar. 26, 2010.

(51) Int. Cl.
H04W 4/00 (2009.01)
(52) U.S. Cl.
USPC ............ 370/329; 370/444; 455/450; 455/515
(58) Field of Classification Search
None
See application file for complete search history.

(56) References Cited

U.S. PATENT DOCUMENTS

| 7,929,537 | B2 * | 4/2011 | Vasudevan et al. | ........... 370/392 |
| 2008/0298325 | A1 * | 12/2008 | Vujcic | ........................ 370/336 |
| 2009/0286512 | A1 * | 11/2009 | Huber et al. | .................. 455/411 |
| 2011/0143712 | A1 * | 6/2011 | Christensson et al. | ........ 455/410 |
| 2011/0199905 | A1 * | 8/2011 | Pinheiro et al. | ............... 370/235 |
| 2012/0004003 | A1 * | 1/2012 | Shaheen et al. | ............... 455/509 |

FOREIGN PATENT DOCUMENTS
WO WO 99/44379 A1 9/1999

OTHER PUBLICATIONS

3GPP: "3rd Generation Partnership Project; Technical Specification Group Services and System Aspects; Access Class Barring and Overload Protection; (Release 6)", 3GPP Draft; TR 23.898 V2.0.0 Marked, 3rd Generation Partnership Project (3GPP), Mobile Competence Centre; 650, Route Des Lucioles; F-06921 Sophia-Antipolis Cedex; France, vol. CN WG1, Feb. 21, 2005 XP050402727.
Huawei: "RAN enhancements for MTC", 3GPP Draft; R2-101061 RAN Enhancements for MTC 3rd Generation Partnership Project (3GPP), Mobile Competence Centre; 650, Route Des Lucioles ; F 06921 Sophia-Antipolis Cedex ; France, vol. RAN WG2, San Francisco, USA; 20100222, Feb. 16, 2010, XP050421738.
CATT: "Access control of MTC devices", 3GPP Draft; R2-100182, 3rd Generation Partnership Project (3GPP), Mobile Competence Centre ; 650, Route Des Lucioles ; F-06921 Sophia-Antipolis Cedex ; France, vol. RAN WG2, No. Valencia, Spain; 20100118, Jan. 12, 2010, XP050420962.

* cited by examiner

*Primary Examiner* — Brian Roberts
(74) *Attorney, Agent, or Firm* — Roger S. Burleigh (57) ABSTRACT A device type-dependent approach to access control is used to independently control network access by machine-type communication (MTC) and non-MTC devices. A plurality of access classes are defined for each device type. The base station selectively controls access to the network by each device type by sending an access control mask for each defined device type to the wireless terminals within the network.

20 Claims, 6 Drawing Sheets

Fig. 1

| ACCESS CLASS | 9 | 8 | 7 | 6 | 5 | 4 | 3 | 2 | 1 | 0 |
|---|---|---|---|---|---|---|---|---|---|---|
| ACCESS CONTROL MASK | 0 | 0 | 1 | 0 | 0 | 0 | 1 | 0 | 1 | 0 |

ACCESS CONTROL FOR MACHINE-TYPE COMMUNICATION DEVICES

RELATED APPLICATION

This application claims the benefit of U.S. Provisional Patent Application 61/317,910 filed Mar. 26, 2010, which is incorporated herein by reference.

BACKGROUND

The present invention relates generally to access control in mobile communication networks and, more particularly to access control for machine-type wireless terminals.

The random access channel (RACH) in mobile communication networks provides contention-based access to wireless terminals to request connection setup when no radio resources have been allocated to the wireless terminal. In systems based on the GSM/EDGE standard, the wireless terminal sends an access request message to the network on the RACH. The access request message includes a randomly generated reference value—such as the Reference Request information—for identification purposes, in lieu of an identifier such as the IMSI, for reasons of security and minimizing the amount of information sent by a wireless terminal to accomplish contention resolution. The wireless terminal then monitors the Access Grant Channel (AGCH) for a response. The network may either accept or deny the access request. If it accepts it, the network transmits an Immediate Assignment (IA) message on the AGCH, identifying the wireless terminal by the random reference value included in the access request message and assigning it radio resources. If the network denies access to the requesting wireless terminal, it transmits an Immediate Assignment Reject (IAR) message.

Contention occurs on the RACH occur when two or more wireless terminals attempt to access the communication network at the same time. In the event of a contention, the network will resolve the contention in favor of one of the wireless terminals. The unsuccessful wireless terminals will then "back-off" and transmit a new access request at a later time. As the number wireless terminals increases, there is a greater probability of contention between the wireless terminals and a greater number of access attempts will fail. If too many contentions occur, throughput on the RACH will be significantly reduced.

The anticipated introduction of a large volume of machine-type communication (MTC) devices in the near future will greatly increase the problem of congestion on the RACH. MTC devices are devices, such as a meter or sensor, that collect and send data to an MTC server or other MTC device over a communication network. It is expected that MTC devices will far outnumber non-MTC devices, such as user terminals for voice and data communications by human users. Therefore, there is a need to implement new procedures to control network access by MTC devices and minimize the impact on non-MTC devices.

SUMMARY

The present invention provides methods and apparatus for controlling network access on a contention-based random access channel by MTC devices or other access terminal. More particularly, a type-dependent approach to access control is used to independently control network access by MTC and non-MTC devices. A plurality of access classes are defined for each device type. For each device type, a base station can control the load on the RACH by barring wireless terminals in one or more access classes from accessing the communication network. The base station informs the wireless terminals of each type about which classes are barred by sending an access control mask to the wireless terminals. The access control mask comprises a sequence of access control bits; one for each defined access class. The access control bit may be set to a first value (e.g., "0") to allow network access by devices within the corresponding access class and to a second value (e.g., "1") to bar access by devices within the corresponding access class.

In some embodiments, a device-type may be further divided into two or more subtypes. Access classes can be defined for each sub-type so that the base station can apply different barring rules to devices depending on the sub-type.

Exemplary embodiments of the invention comprise access control methods implemented by a wireless terminal in a communication network. In one exemplary embodiment, an access control function in the wireless terminal determines a device type for the wireless terminal for the access attempt and an access class corresponding to the device type. The device type may be different for different access attempts triggered by different applications supported by the same wireless terminal. After determining the device type, the access control function selects an access control mask from a set of access control masks based on the device type. Each access control mask comprises a plurality of access control bits indicating whether respective access classes for the corresponding device type are allowed to access the communication network. The access control function controls access to the network by the wireless terminal in dependence on the access control bit in the selected access control mask corresponding to the access class of the wireless terminal.

Other embodiments of the invention comprise a wireless terminal. In one exemplary embodiment, the wireless terminal comprises a transceiver circuit for communicating with a base station in a communication network, and a processing circuit connected to the transceiver circuit for controlling access to the communication network by the wireless terminal. The processing circuit includes an access control processor configured to determine a device type for the wireless terminal for an access attempt, to determine an access class for the device type, and to select an access control mask from a set of access control masks based on the device type. The access control mask comprises a plurality of access control bits indicating whether respective access classes for the corresponding device type are allowed to access the communication network. The access control processor is further configured to control access to the network by the wireless terminal in dependence on the access control bit in the selected access control mask corresponding to the access class of the wireless terminal.

Other embodiments of the invention comprise access control methods implemented by a base station in a communication network. In one exemplary embodiment, an access control function in the base station determines first and second access control masks for a first and second device types respectively. Each access control mask comprises a plurality of access control bits for corresponding access classes. The access control processor is further configured to transmit the first and second access control masks to wireless terminals within the communication network.

Still other embodiments of the invention comprise a base station for a communication network. In one exemplary embodiment, the base station comprises a transceiver circuit for communicating with one or more wireless terminals, and a processing circuit connected to the transceiver circuit for controlling access to the a communication network by wireless terminals within the communication network. The processing circuit includes an access control processor configured to determine first and second access control masks for a first and second device types respectively. Each access control mask comprises a plurality of access control bits for corresponding access classes. The access control processor is further configured to transmit via the transceiver circuit the first and second access control masks to wireless terminals within the communication network.

The present invention provides a mechanism for the base station to separately control network access by MTC and non-MTC devices that share the same RACH resources. Thus, the base station can determine how the network resources are best allocated between MTC and non-MTC devices and between MTC devices for the case where subtypes of MTC devices can be identified.

DETAILED DESCRIPTION

Figure 1:
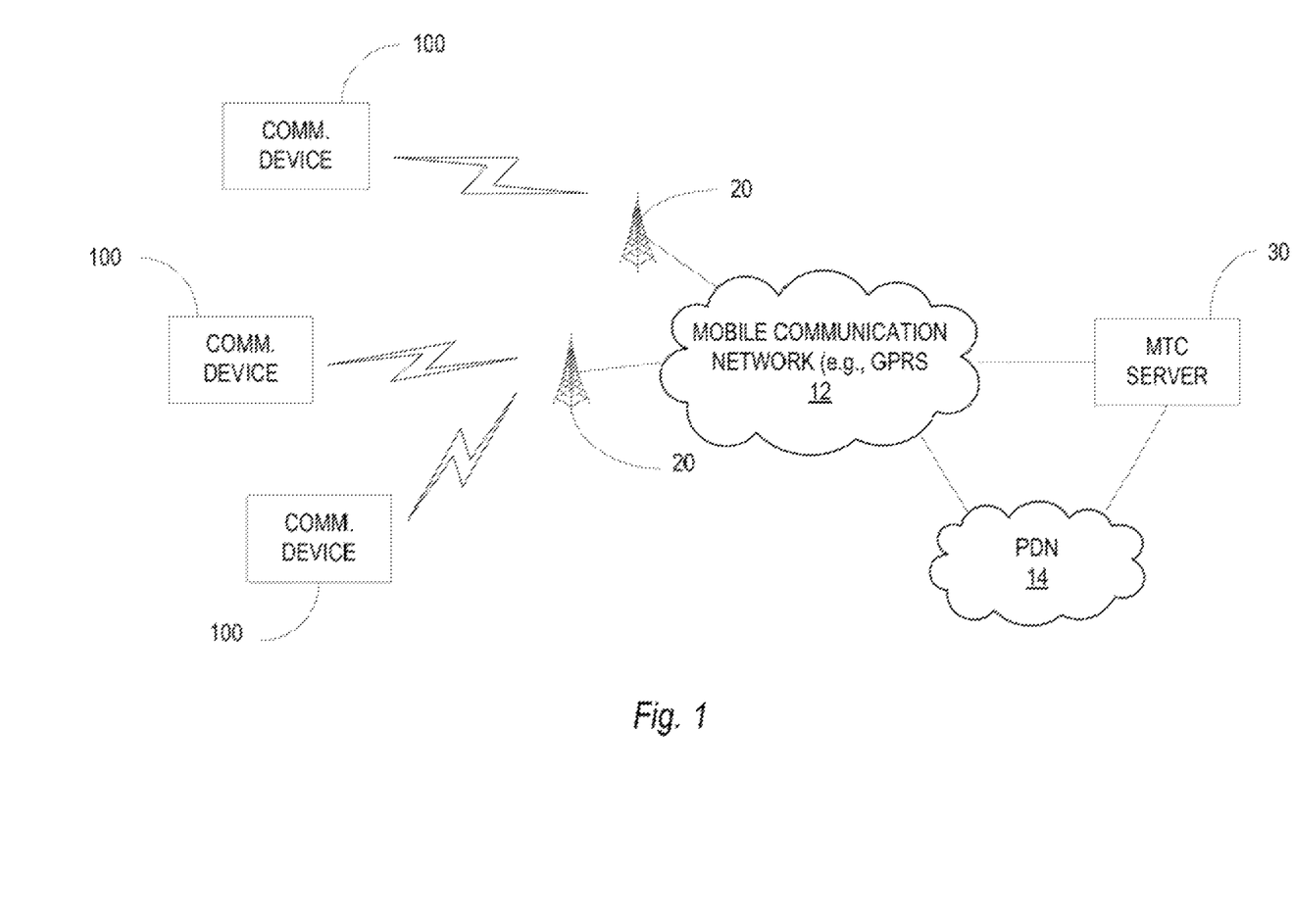
FIG. 1 illustrates an exemplary communication network for communication by MTC devices.

Referring now to the drawings, FIG. 1 illustrates an exemplary wireless communication network 10. The communication network 10 may, for example, comprise a mobile communication network 12 that operates according to any standard that employs a contention-based random access channel (RACH). For illustrative purposes, an exemplary embodiment of the present invention will be described in the context of a network operating according to the GSM/EDGE (Global System for Mobile Communication (GSM) Packet Radio Service) standard. Those skilled in the art will appreciate, however, that the present invention is more generally applicable to other wireless communication systems, including Wideband Code Division Multiple Access (WCDMA), Long-Term Evolution (LTE), and Worldwide Interoperability for Microwave Access (WiMAX) systems. The mobile communication network 10 comprises a core network 12 that connects to an external packet data network 14, such as the Internet, and a plurality of base stations 20 that provide network access to wireless terminals 100. The wireless terminals 100 may communicate with one or more servers 30 connected to the mobile communication network 10 or packet data network 14.

The wireless terminals 100 may comprise machine-type communication (MTC) devices for collecting and reporting of data over a communication network or non-MTC devices. Machine Type Communications (MTC) has been defined as a specific type of wireless communication network traffic. See, e.g., 3GPP Technical Report 23.888, "System Improvements for Machine-Type Communications," the disclosure of which is incorporated herein by reference in its entirety. One example of an MTC device is a gas or power meter with a wireless transceiver for reporting at predetermined time periods usage of gas or electrical power to the MTC server 30. Non-MTC devices are devices, such as a cell phone, smart phone, laptop computer, etc., used for voice and data communications by human users. An MTC device may comprise a dedicated device specifically for data collection and reporting. In other embodiments, a combined wireless terminal 100 may function part of the time as a MTC device and part of the time as a non-MTC device.

In order to send the data, a wireless terminal 100 must first establish a connection with the communication network 10. Typically, the wireless terminal 100 registers with the communication network 10 on power up. After registering with the network 10, the wireless terminal 100 may enter an IDLE mode. In the IDLE mode, the wireless terminal 100 does not have an established connection with a base station 20. When the wireless terminal 100 has data to send, it uses a random access procedure to establish a connection with the base station 20 to transmit the data. After the data is transmitted, the wireless terminal 100 may terminate the connection with the base station 20 and return to an IDLE mode. In most typical applications, the wireless terminal 100 will remain attached with the network 10. However, the wireless terminal 100 could detach from the network 10 after sending the data.

Currently, both MTC devices and non-MTC devices all use the same RACH resources. Thus, MTC devices and non-MTC devices must contend with one another for access on the RACH. Due to the rapid growth of MTC devices, it is expected that the number of MTC devices will far exceed the number of non-MTC devices in the near future. To avoid overload and congestion of the RACH, the service providers will require a greater degree of control over network access by MTC devices.

In one exemplary embodiment of the invention, access class barring is used to control the load on the RACH and to restrict network access by some wireless terminals 100 based on the device type associated with each wireless terminal. More particularly, the wireless terminals 100 are grouped into two or more access classes for a given device type. The base station 20 can thus control the load on the RACH by barring wireless terminals in one or more access classes from accessing the communication network 12. The base station 20 informs the wireless terminals 100 which classes are barred by sending an access control mask to the wireless terminals 100. The access control mask comprises a sequence of access control bits; one for each defined access class.

Figure 2:
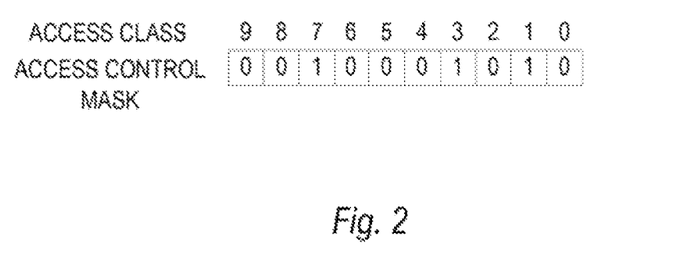
FIG. 2 illustrates an exemplary access control mask for implementing access class barring.

An exemplary access control mask is shown in FIG. 2. In the example shown in FIG. 2, there are ten access control bits corresponding to ten different access classes associated with a given device type. Each access control bit indicates whether wireless terminals in a corresponding access class are barred. In this example, an access control bit set to "0" indicates that network access is allowed by wireless terminals in the corresponding class and an access control bit set to "1" indicates that access barred. The bit position indicates the corresponding access class. In the example shown in FIG. 2, access control bits 1, 3, and 7 are set to "1" indicating that wireless terminals 100 in those access classes are barred from attempting a random access on the RACH.

According to various embodiments of the present invention, separate access classes are defined for MTC devices and non-MTC devices. In one exemplary embodiment, ten access classes are defined for both MTC devices and non-MTC devices, for a total of 20 access classes. Additional access classes could also be defined for MTC and non-MTC devices. The base station 20 controls access to a shared RACH separately for both MTC and non-MTC devices by sending an access control mask for each device type to the wireless terminals 100. The access masks may be transmitted, for example, along with system information on the Broadcast Control Channel (BCH).

When a wireless terminal 100 attempts to access the network 10, an access control function within the wireless terminal 100 determines the type of the wireless terminal 100 and its access class. Based on the device type, the access control function selects the appropriate access control mask and determines the value of the access control bit corresponding to the access class of the communication 100. If the access control bit is set to "0," access is allowed. If the access control bit is set to "1", access is barred. Thus, the base station 20 may use one access control mask to control network access by MTC devices and a different access control mask to control access by non-MTC devices.

Figure 3:
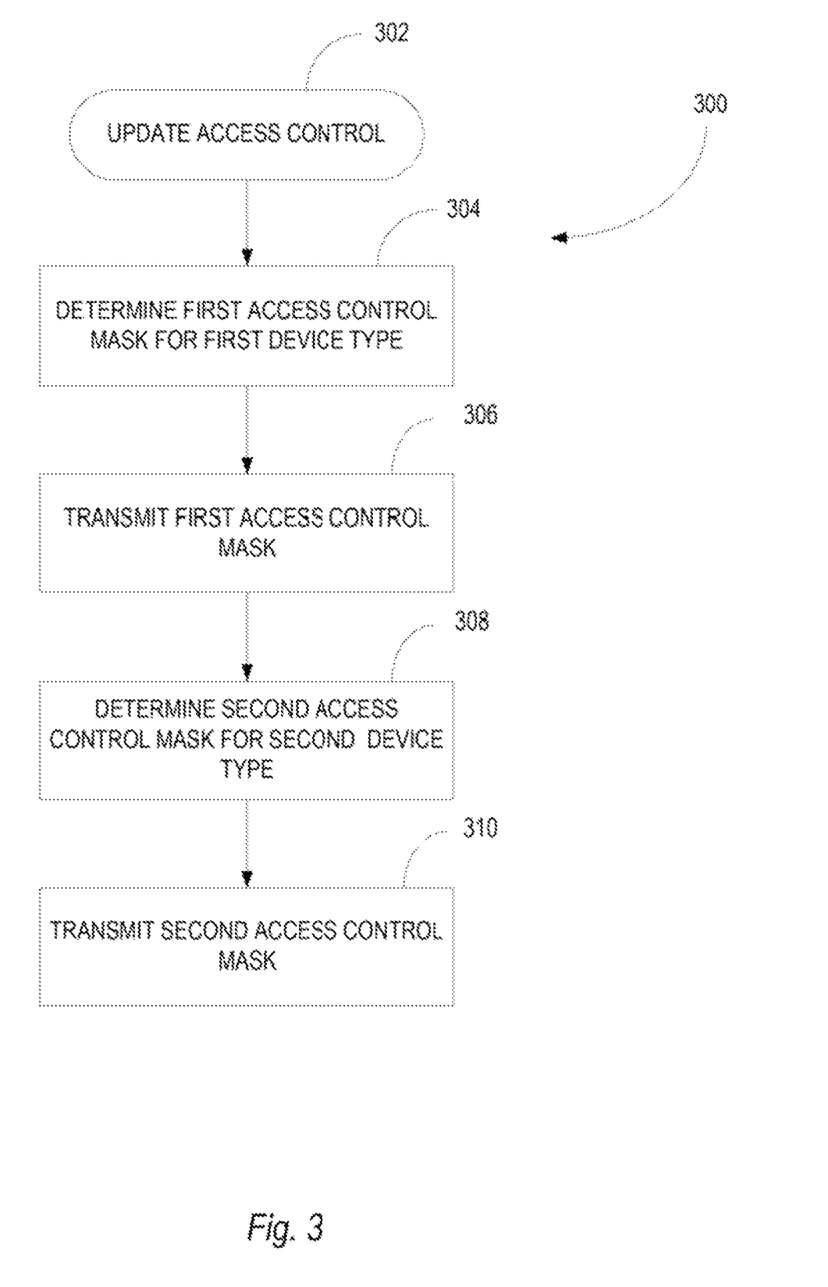
FIG. 3 illustrates an exemplary method of access control implemented by a base station.

FIG. 3 illustrates an exemplary procedure 300 implemented by a base station 20 for controlling network access by both MTC and non-MTC devices sharing the same RACH resources. The procedure 300 begins when an update of the access control rules is triggered (302). An update may be triggered at specified time intervals or specified times of day, or may be triggered responsive to predetermined events. As one example, update of the access control rules may be triggered when the load on the RACH reaches a predetermined level.

When the update to the access control rules is triggered, the access control function in the base station 20 determines an access control mask for a first device type (304) and transmits the first access control mask to the wireless terminals 100 (306), which will be read only by wireless terminals 100 of the first type. The first device type may comprise, for example, MTC devices. The access control function also determines a second access control mask for a second device type (308) and transmits the second access control mask to the wireless terminals 100 (310), which will be read only by wireless terminals 100 of the second type. The second device type may, for example, comprise non-MTC devices. As previously noted, the access control masks comprises a plurality of access control bits corresponding to the defined access classes. The access control function determines the access classes that will be barred and sets the access control bits accordingly. The first and second access control masks may be transmitted at the same time. For example, the access control masks for both MTC and non-MTC devices may be transmitted along with system information on the BCCH.

Figure 4:
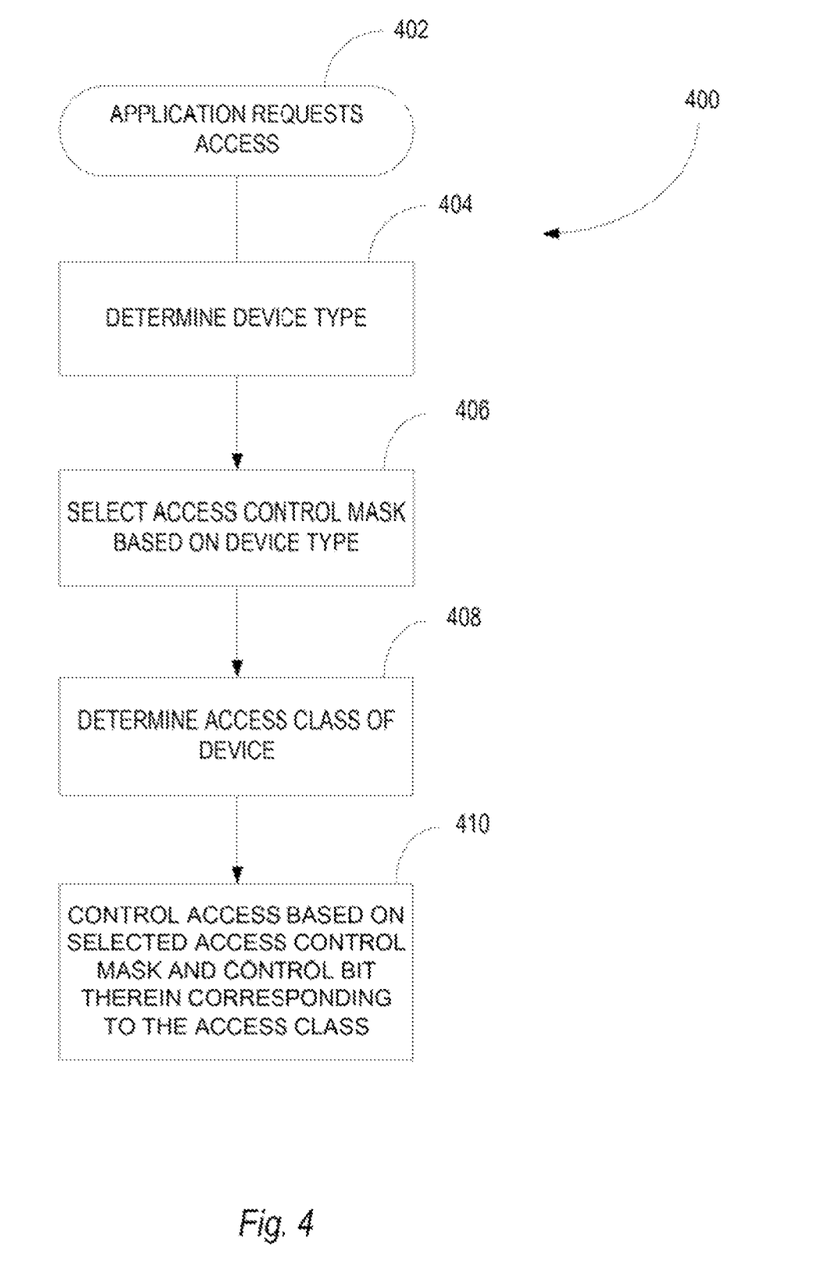
FIG. 4 illustrates an exemplary access control procedure did implemented by an access terminal in a wireless terminal.

FIG. 4 illustrates an exemplary procedure 400 implemented by a wireless terminal 100. The procedure 400 is triggered when a wireless terminal 100 is requested to send information or data to the network (402). When an application has data to send, the access control function in the wireless terminal 100 determines the appropriate device type (404) and selects an access control mask based on the device type (406). If the wireless terminal 100 is functioning as a MTC device, it selects the access control mask for MTC devices. If the wireless terminal 100 is functioning as a non-MTC device, it selects the access control mask for non-MTC devices. It should be noted that some wireless terminals may be capable of functioning as either a MTC or non-MTC device at different times. Depending on the application, the wireless terminal 100 may be considered a MTC device for one access attempt and a non-MTC device for another access attempt. The access control function also determines the access class of the mobile wireless terminal 100 (408) and controls access to the network based on the access control bit in the selected access control mask (410). As an example, for access class 3, the access control function determines the value of the fourth bit in the access control mask and permits or bars access based on the value of the fourth access control bit. If the fourth bit is set to 0, access is allowed. If the fourth bit is set to 1, access is barred.

Using type specific access control masks enables the base station 20 to independently control network access by MTC and non-MTC devices over shared RACH resources. For example, during peak hours, the base station 20 may decide to bar a higher percentage of MTC devices compared to non-MTC devices.

In some embodiments of the invention, a given device type may be further divided into sub-types. Access classes can be defined for each sub-type. In those cases, the base station 20 can separately control access for each sub-type by sending a separate access control mask for each sub-type. The sub-types can be based on device-specific, application-specific, or service specific attributes.

In one exemplary embodiment of the invention, MTC devices are divided into three sub-types, depending on whether the associated MTC device is attached and the location of the MTC device. More particularly, the sub-types are defined as follows:

sub-type 1—MTC device is not attached to the network;
sub-type 2—MTC device is attached and is located in the same routing area where it attached;
sub-type 3—MTC device is attached and is located in a new routing area.

In this embodiment, the base station 20 may send an access control mask for each sub-type to separately control access attempts based on whether the MTC devices are attached and the location of the MTC device.

It is expected that a very large volume of MTC devices may be introduced in the near future. In this case, RACH congestion becomes a significant concern if MTC and non-MTC devices share the same RACH resources. Congestion caused by the sheer volume of MTC devices 100 will mean more access attempts are likely to fail and that non-MTC devices will have a more difficult time gaining access to the network on the RACH.

To avoid congestion, additional RACH resources may be allocated to and used for access by MTC devices exclusively. These resources are referred to herein as MTC RACH resources. The MTC RACH may implement the same random access procedures as currently defined in GSM/EDGE standards. However, using a dedicated or reserved RACH for MTC devices avoids contention with non-MTC devices. Resources can be allocated between the conventional RACH and the MTC RACH such that the contention access performance for non-MTC devices is not affected.

The MTC RACH resources may be used during specified periods of time during the day. During the specified times, MTC devices may use the dedicated MTC RACH for random access attempts. During other periods, the MTC RACH resources can be used for other purposes. In some embodiments, the dedicated MTC RACH may be used by any MTC device. In other embodiments, the dedicated MTC RACH may be reserved for use by MTC devices supporting specified MTC features or applications. The base station 20 may transmit supplemental system information to the MTC devices and non-MTC devices that identify the frequency and base station identity code (BSIC) of the MTC RACH channels. The system information may indicate the time of day during which any given MTC RACH may be used. In some embodiments, the network may allocate multiple MTC RACHs to support MTC devices with different features.

Information about the MTC RACH can be conveyed to MTC devices over a broadcast control channel (BCCH) or cell broadcast channel (CBCH). For example, information on MTC RACH resources could be added to existing system information messages transmitted on the BCCH. Because the BCCH was originally designed for the purpose of transmitting information with a periodicity in the range of seconds, it may be more efficient from a bandwidth utilization perspective to transmit such information on the CBCH. The presence of a CBCH in a given cell is indicated in the system information type 4 message broadcast in the cell. When the CBCH is active in a cell, all wireless terminals 100 supporting cell broadcast will monitor the CBCH. The use of the CBCH to transmit information about the MTC RACH resources may be beneficial when it is supported because the CBCH may be underutilized and provides a great deal of flexibility regarding the frequency of transmission for MTC RACH specific information.

In some embodiments, there could be a need to indicate CBCH support for MTC devices only. To prevent legacy devices 100 from monitoring the CBCH in a given cell, the CBCH information broadcast in the system information message may be modified to indicate CBCH support for MTC devices only.

A MTC device entering a cell where CBCH is active will read each CBCH message slot (transmitted every 1.88 seconds) until it receives a schedule message, after which the MTC device may enter a discontinuous receiving (DRX) mode. In the DRX mode, the MTC device reads the CBCH message slots of interest. The maximum interval between schedule messages is 75.2 seconds, which may be too short for a cell in which MTC devices operate. The schedule message may be modified to specify an MTC device specific schedule, while legacy devices follow the original schedule. The MTC device specific schedule period could be included in a normal CBS message targeted to MTC devices and broadcast according to conventional repetition.

Information about the MTC RACH could also be transmitted on the packet access control channel (PACCH) when the presence of an MTC device is detected. For example, some control messages transmitted by a wireless terminal 100 may include information indicating that the device 100 is an MTC device. In this case, the base station 20 may send the MTC RACH information on the PACCH using the downlink transmit block format established to send other signaling messages.

Figure 5:
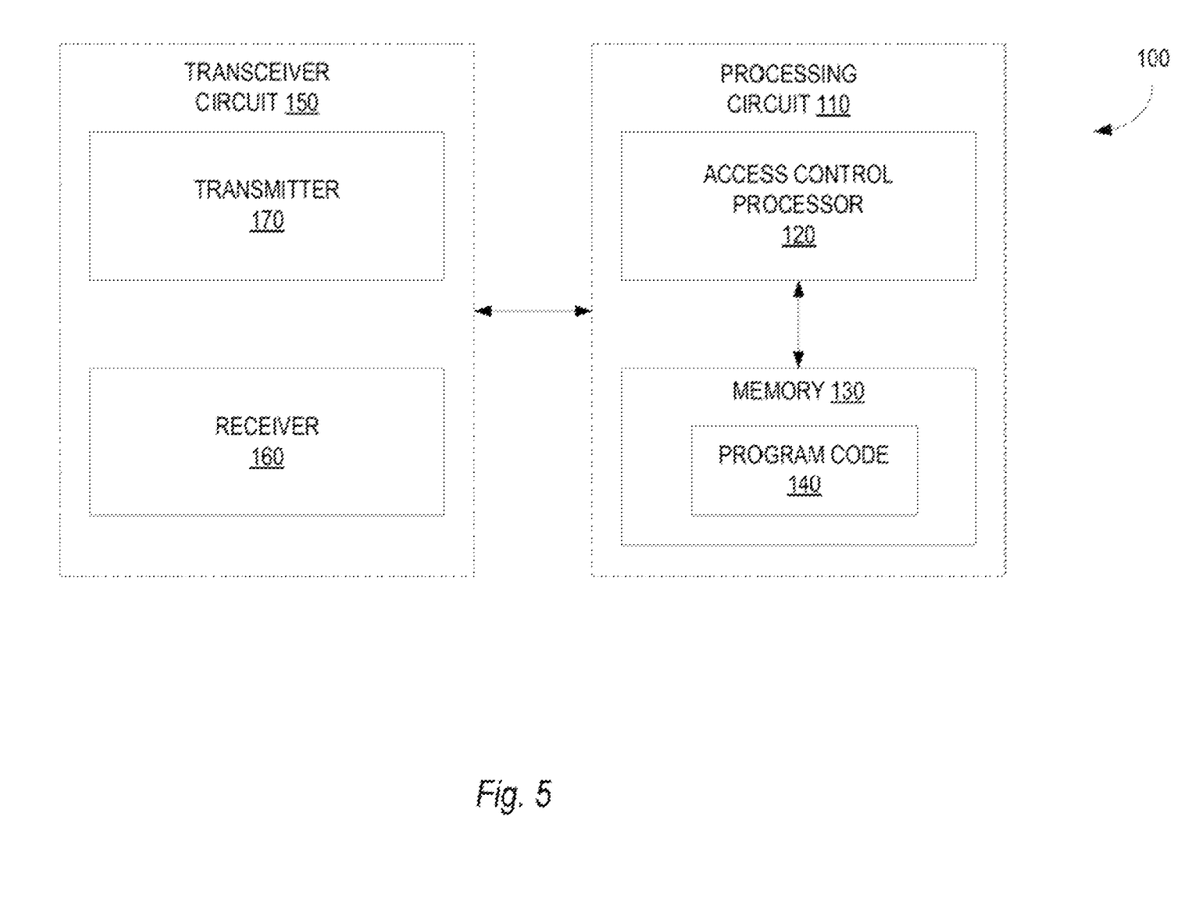
FIG. 5 illustrates a wireless terminal implementing a layered access control scheme.

FIG. 5 illustrates an exemplary wireless terminal 100 that may function as an MTC device, non-MTC device, or both. The wireless terminal 100 includes a processing circuit 110 connected to a transceiver circuit 150 that communicates with base stations 20 in the mobile communication network 10. The processing circuit 110 includes an access control processor 120 and memory 130 for storing program code 140 controlling operation of the wireless terminal 100. The program code 140 includes code for performing the access control functions as herein described. The transceiver circuit 150 comprises a receiver 160 and transmitter 170 for communicating with the base station 20. The transceiver circuit 150 may operate, for example, according to the GSM/EDGE standard or other communication standard.

Figure 6:
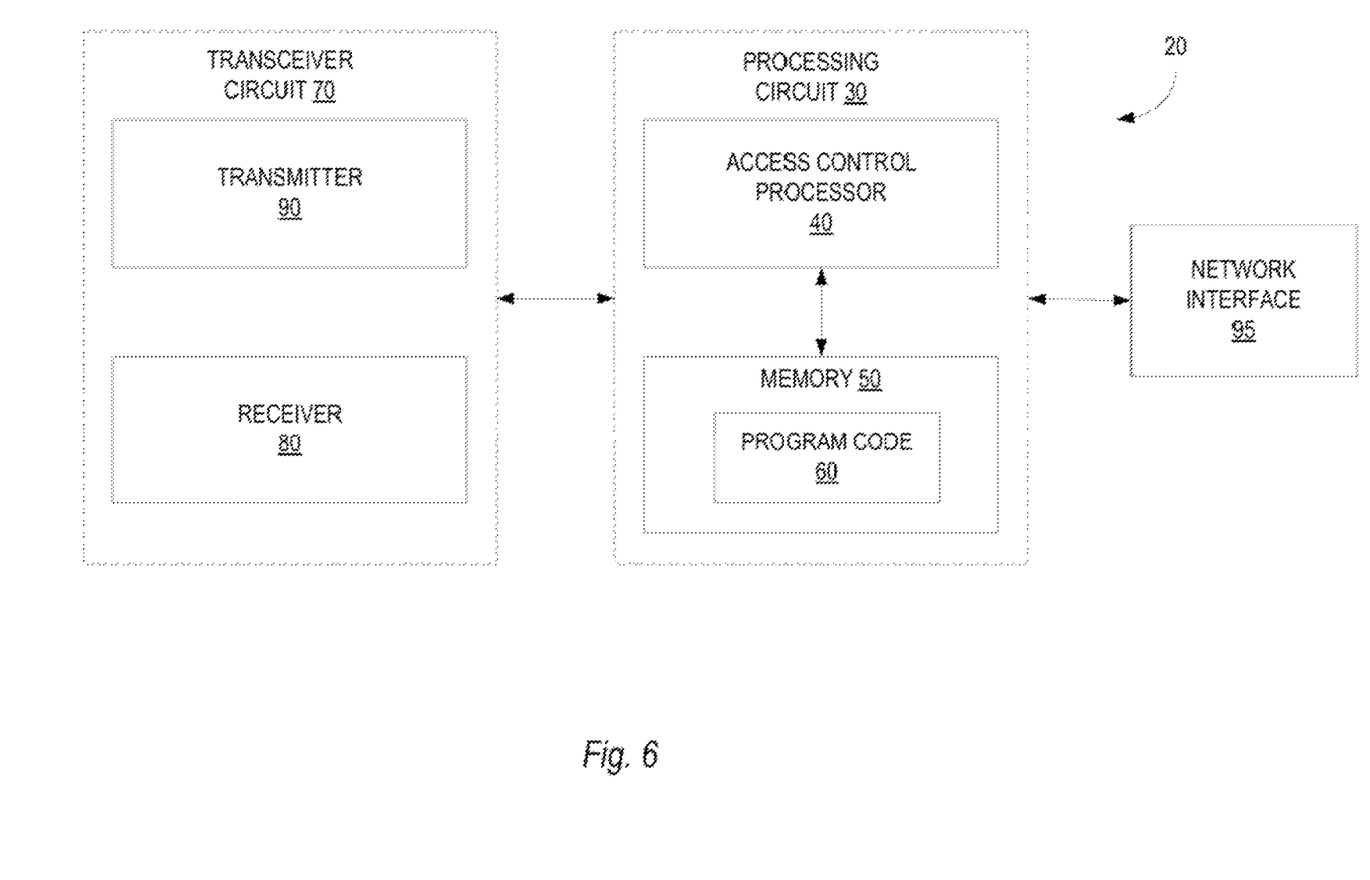
FIG. 6 illustrates an exemplary base station implementing a layered access control scheme

FIG. 6 illustrates an exemplary base station 20 that implements the access control functions as herein described. The base station 20 includes a processing circuit 30 connected to a wireless transceiver circuit 50 that communicates with wireless terminals 100 in the mobile communication network 10, and a network interface 95. The processing circuit 30 includes an access control processor 40 and memory 50 for storing program code 60 controlling operation of the base station 20. The program code 60 includes code for performing the access control functions as herein described. The transceiver circuit 70 comprises a receiver. 80 and transmitter 90 for communicating with the base station 20. The transceiver circuit 70 may operate, for example, according to the GSM/EDGE standard or other communication standard. The network interface 95 enables the base station 20 to communicate with other base stations 20 and network nodes within the core network 12.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An access control method implemented by a wireless terminal in a mobile communication network, the method comprising:

determining a device type for a wireless terminal for an access attempt;

selecting an access control mask from a set of access control masks based on the device type, each access control mask comprising a plurality of access control bits indicating whether respective access classes for the corresponding device type are allowed to access the communication network;

determining an access class for the wireless terminal; and,     controlling access to the network by the wireless terminal in dependence on an access control bit in the selected access control mask corresponding to the determined access class of the wireless terminal.

2. The method of claim 1, wherein the set of access control masks includes at least one access control mask for machine-type wireless terminals and at least one access control mask for other wireless terminals.

3. The method of claim 2, wherein the set of access control masks include two or more access control masks for machine-type wireless terminals and wherein selecting an access control mask for a wireless terminal from a set of access control masks is further based on a connection state of the wireless terminal.

4. The method of claim 3, wherein the access control masks for machine-type wireless terminals include a first access control mask for a machine-type wireless terminal that is not attached to the communication network and a second access control mask for a machine-type wireless terminal that is attached to the communication network.

5. The method of claim 4, wherein the access control masks for machine devices include a third access control mask for a machine-type wireless terminal that has moved from an original routing area where it first attached to the communication network to a new routing area.

6. A wireless terminal comprising:

a transceiver circuit for communicating with a base station in a communication network;

a processing circuit connected to the transceiver circuit for controlling access to the communication network by the wireless terminal, the processing circuit including an access control processor configured to:

determine a device type for the wireless terminal for an access attempt;

select an access control mask from a set of access control masks based on the device type, each access control mask comprising a plurality of access control bits indicating whether respective access classes for the corresponding device type are allowed to access the communication network;

determine an access class for the wireless terminal; and, control access to the network by the wireless terminal in dependence on the access control bit in the selected access control mask corresponding to the determined access class of the wireless terminal.

7. The mobile terminal of claim 6, wherein the set of access control masks includes at least one access control mask for machine-type wireless terminals and at least one access control mask for other wireless terminals.

8. The mobile terminal of claim 7, wherein the set of access control masks include two or more access control mask for machine-type wireless terminals and wherein the access control processor is configured to select an access control mask for a machine-type wireless terminal from the set of access control masks based further on a connection state of the wireless terminal.

9. The mobile terminal of claim 8, wherein the access control processor is configured to select a first access control mask for machine-type wireless terminals not attached to the communication network and to select a second access control mask for machine-type wireless terminals attached to the communication network.

10. The mobile terminal of claim 9, wherein the access control processor is further configured to select a third access control mask for machine-type wireless terminals attached and have moved from an original routing area where it first attached to the communication network to a new routing area.

11. A method implemented by a base station for controlling access to a communication network by wireless terminals, the method comprising:
   determining a first access control mask for a first device type, the first access control mask comprising a plurality of first access control bits for corresponding access classes for the first device type;
   transmitting the first access control mask to one or more wireless terminals;
   determining a second access control mask for a second device type, the second access control mask comprising a plurality of second access control bits for corresponding access classes for the second device type; and
   transmitting the second access control mask to the wireless terminals.

12. The method of claim 11, wherein the first device type comprises a machine-type wireless terminal.

13. The method of claim 12, wherein determining an access control mask for the first device type comprises:
   determining two or more access control masks for sub-types of the first device type.

14. The method of claim 13, wherein a first sub-type comprises machine-type wireless terminals not attached to the communication network and a second sub-type comprises machine-type wireless terminals attached to the communication network.

15. The method of claim 14, wherein a third sub-type comprises machine-type wireless terminals attached to the communication network that have moved from an original routing area to a new routing area.

16. A base station in a communication network, the base station comprising:
   a transceiver circuit for communicating with one or more wireless terminals;
   a processing circuit connected to the transceiver circuit for controlling access to the a communication network by the wireless terminals, the processing circuit including an access control processor configured to:
      determine a first access control mask for a first device type, the first access control mask comprising a plurality of first access control bits for corresponding access classes for the first device type;
      transmit the first access control mask to one or more wireless terminals;
      determine a second access control mask for a second device type, the second access control mask comprising a plurality of second access control bits for corresponding access classes for the second device type; and
      transmit the second access control mask to the wireless terminals.

17. The base station of claim 16, wherein the first device type comprises a machine-type wireless terminal.

18. The base station of claim 17, wherein the access control processor is further configured to:
   determine two or more access control masks for sub-types of the first device type.

19. The base station of claim 18, wherein a first sub-type comprises machine-type wireless terminals not attached to the communication network and a second sub-type comprises machine-type wireless terminals attached to the communication network.

20. The base station of claim 19, wherein a third sub-type comprises machine-type wireless terminals attached to the communication network that have moved from an original routing area to a new routing area.

* * * * *

UNITED STATES PATENT AND TRADEMARK OFFICE
CERTIFICATE OF CORRECTION

PATENT NO. : 8,462,722 B2
APPLICATION NO. : 13/051345
DATED : June 11, 2013
INVENTOR(S) : Diachina et al.

Page 1 of 1

It is certified that error appears in the above-identified patent and that said Letters Patent is hereby corrected as shown below:

In the Specification

Column 2, Line 67, delete "to the a" and insert -- to the --, therefor.

Column 3, Line 31, delete "scheme" and insert -- scheme. --, therefor.

Column 8, Line 1, delete "receiver. 80" and insert -- receiver 80 --, therefor.

In the Claims

Column 9, Line 10, in Claim 8, delete "mask for" and insert -- masks for --, therefor.

Column 10, Line 15, in Claim 16, delete "to the a" and insert -- to the --, therefor.

Signed and Sealed this
Eighth Day of October, 2013

Teresa Stanek Rea
*Deputy Director of the United States Patent and Trademark Office*